United States Patent Office 3,186,399
Patented June 1, 1965

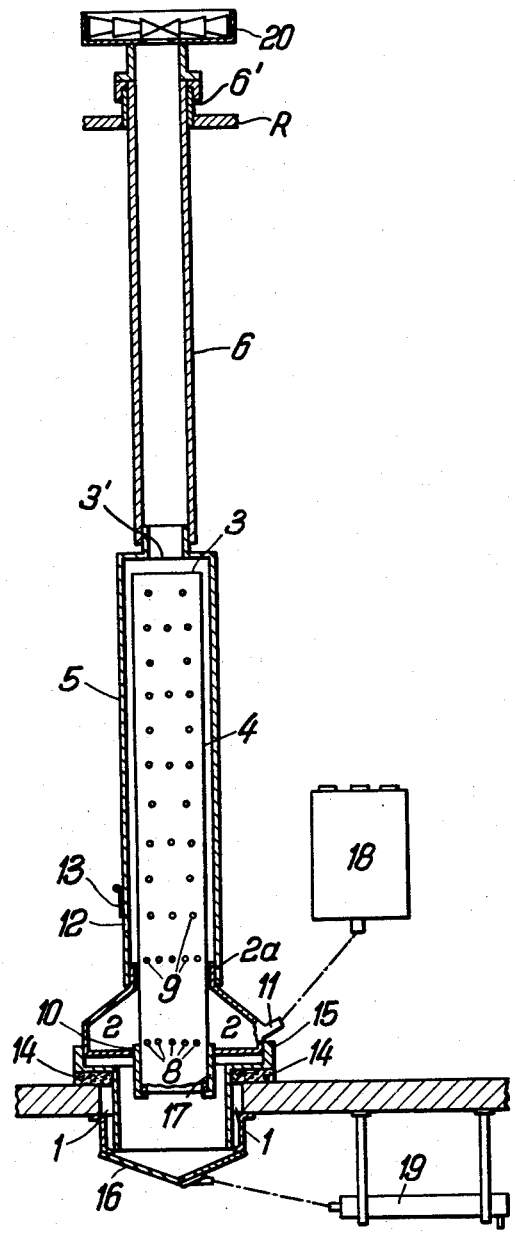

3,186,399
TUBULAR OIL-HEATING FURNACE FOR VEHICLES NOT RUNNING ON RAILS
Josef Peters, Claude-Lorrain-Strasse 9,
Munich, Germany
Filed Dec. 7, 1961, Ser. No. 157,624
Claims priority, application Germany, Dec. 10, 1960,
P 26,193
4 Claims. (Cl. 126—94)

The present invention relates to a tubular oil-heating furnace for vehicles and other small rooms, in general, and to such oil-heating furnace having a centrally disposed air-feeding tube equipped with perforations, which airfeeding tube is surrounded coaxially by a second tube open at its upper end for the escape of the flue gases and which has a closed wall, in particular.

All known oil-heating furnaces are not suitable for the permanent heating of vehicles, as for instance house trailers or the like, either because they would violate city ordinances and law enactments due to the existing danger of explosion or the danger of escape of poisonous gases into the vehicle to be heated, and due to the fact that they require too much space, that they are difficult to clean or they are sensible in their function against jolts, against rollings and against tilting, or because they suck off from the inside of the vehicle to be heated, either totally or partly, the air required for the combustion of the oil.

It is, therefore, one object of the present invention to provide a tubular oil-heating furnace for vehicles, in which the oil-heating furnace requires the lowest possible space and has the lowest possible weight, and its function is independent from the movement or position of the room to be heated and the installation of the furnace can take place without possible violation of legal provisions.

The United States Patent No. 2,902,027 discloses a burner device for liquid fuel adapted to be inserted into a furnace jacket, and which is equipped with a centrally disposed, air-feeding tube having perforations, which airfeeding tube is surrounded coaxially by a tube having a closed wall. The airfeeding tube of this burner device is open at its top and is closed up by means of a perforated bottom. Below the bottom is disposed in a tube having a closed wall the evaporation chamber equipped with a baffle ring which is not widened relative to the tube, a fuel tank and a fuel feeding connection. The combustion air is sucked in from above into the space to be heated, the fuel gases being fed laterally from the tube having a closed wall into a chimney. The fuel feeding must be controlled by a float control.

It is another object of the present invention to provide a tubular oil-heating furnace for vehicles which comprises a central air-feeding tube equipped with perforations, which air-feeding tube is surrounded by a tube having a closed wall, which is open, however, at its upper end for the escape of the flue gases and which is characterized by the fact that the upper end of the air-feeding tube is closed and the lower end thereof is open and surrounded coaxially by evaporation chamber, at least the upper portion of which is reduced in diameter upwardly towards the air-feeding tube, and which has an oil-feed controllable without a float, the tube with a closed wall starting upwardly from the portion of the evaporation chamber having a reduced end and the lowermost series of perforations of the air-feeding tube being arranged closely above the bottom portion of the evaporation chamber.

It is yet another object of the present invention to provide a tubular oil-heating furnace for vehicles and other small rooms, which comprises substantially the actual cylindrical burner itself, the closed outer wall of which, which limits the combustion chamber outwardly, continues as escape tube for the flue gases beyond the upper closed end of the air-feeding tube and through the ceiling of the vehicle and, thereby, feeds the flue gases into the free atmosphere.

The lower open end of the air-feeding tube projects suitably through the bottom of the vehicle, so that the air is sucked in from the outside of the room to be heated.

It is yet another object of the present invention to provide a tubular oil-heating furnace for vehicles, wherein the air-feeding tube is equipped with additional perforations distributed over the entire length and the periphery of the tube above the lowermost series of perforations, these additional perforations permitting the feeding of so much air into the annular combustion chamber that the required ratio of oil vapor to air for the combustion is obtained.

It is still a further object of the present invention to provide a tubular oil-heating furnace for vehicles, wherein the measurement of the air-feeding tube and of the outer tube can be chosen in such manner, that the width of the annular combustion chamber between these tubes is small in comparison with the diameter of the central air-feeding tube. By this arrangement it is brought about that the heat of combustion is led off nearly completely through the wall of the closed outer tube functioning as a baffle plate into the room to be heated.

The number of the perforations of the air-feeding tube and their size should be adapted to the ratio of oil vapors to air necessary for the combustion of the oil vapors, and the distribution of the perforations over the length of the air-feeding tube should be chosen such that in case of maximum evaporation of oil in the evaporation chamber the combustion of the oil vapors is completed at the upper end of the annular combustion chamber, and preferably the measurements of the evaporation chamber should be chosen so as to prevent glowing of the closed outer tube even in case of maximum evaporation.

For the ignition of the furnace it is possible to provide in the closed outer tube or in the wall of the evaporation chamber a closable opening, or an electrical ignition device is provided therein.

Below the open end of the air-feeding tube it is possible to provide an oil receptacle, which can be of cup-shape and connected with an oil collector. If the oil does not vaporize due to service errors and collects in the evaporation chamber, it runs off through the lowermost perforations of the air-feeding tube into an oil receptacle and is fed from there into the free atmosphere or into an oil collecting container.

The escape tube for the flue gases can extend also in a direction different from that of the closed outer tube.

The feeding of oil to the furnace takes place from a storage tank by means of a conduit into which suitably a dosing device is inserted, as, for instance, a dropper having an inspection window or a valve marked with dosing markers.

The oil furnace designed in accordance with the present invention can be made of simply formed telescoping individual parts. Thus the air-feeding tube can be inserted releasably into a guide member in the bottom of the evaporation chamber and the closed outer tube may be inserted releasably into a guide member in the upper part of the evaporation chamber and the tube for the flue gases can be releasably mounted on the cylindrical outer tube of the burner which can be reduced in diameter, if required, above the upper closed end of the air-feeding tube. These few parts joined together by mere insertion of one part into another, can be taken apart without any difficulty for the purpose of cleaning. During the operation of the furnace the connecting points of the individual parts are sealed off against the outside by their heat expansion.

Since the control of the oil-feed takes place without a float controller in the furnace, designed in accordance with the present invention, the operation of this furnace is not disturbed by changes of its position by shocks or by rolling.

With these and other objects in view, which will become apparent in the following detailed description, the present invention will be clearly understood in connection with the accompanying drawing, in which the only figure is an axial section of the furnace, designed in accordance with the present invention, disposed in a house trailer.

Referring now to the drawing, the floor portion A of the house trailer has an opening 1 which receives the furnace. This opening 1 is covered suitably with an asbestos ring 14 and a bushing 15 is inserted into the asbestos ring 14. Another asbestos ring (not shown) can be inserted into the bushing 15. The entire furnace is inserted into this bushing arrangement 15. An air-feeding tube 3 having perforations is closed at its upper end by a top wall 3' and is open at its lower end which extends through the opening 1. The lower portion of the air-feeding tube 3 is surrounded coaxially by an evaporation chamber 2 which communicates with a closed tube 5 extending from the evaporation chamber 2 in upward direction.

The evaporation chamber 2 is equipped with an oil-feeding opening 11. At least the upper portion of the evaporation chamber 2 is tapered down in upward direction to surround closely to the air-feeding tube 3. The closed tube 5, which surrounds coaxially the air-feeding tube 3, emerges from the tapered-down end of the evaporation chamber 2.

In the embodiment shown in the drawing, the evaporation chamber 2 is designed in such manner that it is conically reduced upwardly up to a point close to the air feeding tube 3, as has been set forth above, so that a roof-like closure for the evaporation chamber 2 is formed. The evaporation chamber 2 can, however, also assume, for instance, the shape of a ball or of a spherical segment.

The air-feeding tube 3 has near its lower open end a plurality of perforations 8, which are arranged closely above a bottom collar 10 of the evaporation chamber 2. Additional perforations 9 are disposed along the entire length of the air-feeding tube 3.

A flue tube 6 is mounted on the outer tube 5 above the upper closed end of the air-feeding tube 3, and the flue tube 6 sits in a bushing, which is disposed in the roof R of the housing trailer. Outside of the housing trailer a turbine fan 20 can be mounted on the flue tube 6, in order to secure a removal of the flue gases free from disturbances.

An opening 12 is arranged in the outer tube 5, which serves the purpose to permit ignition of the furnace and which opening 12 may be closed by means of a flap or a slide 13.

As shown in the embodiment disclosed in the drawing, the individual parts of the furnace are telescopically joined together. Thus, the air-feeding tube 3 is releasably inserted into a guide 17 provided in the bottom of the evaporation chamber 2. The outer tube 5 is releasably inserted onto a guide projection 2a provided at the upper end of the evaporation chamber 2. The flue tube 6 is mounted on the outer tube 5. Since the flue tube 6 is guided at its upper end in a bushing 6', upon lifting the tube 5, the entire furnace can easily be disassembled.

The oil-feeding opening 11 is connected with an oil tank 18. A feed control (not shown) can be inserted in the connecting tube between the tank 18 and the oil feeding opening 11. The feed control has merely the purpose of dosing the oil quantity which is to be fed into the evaporation chamber 2. A control of the oil level is not required.

An oil receptable 16 can be connected with an oil collector 19 disposed below the floor A of the housing trailer.

The oil heating furnace, designed in accordance with the present invention, operates in the following manner:

A burning igniter, for instance, dry spirit is thrown through the opening 12. The opening 12 is then closed by means of the slide 13. Simultaneously oil is fed through the oil feeding opening 11 from the oil tank 18 into the evaporation chamber 2, which spreads as a thin film over the bottom of the evaporation chamber 2 and is there ignited. The air required for the ignition enters through the openings 8 into the evaporation chamber 2. This burning process can be maintained with a low feed of air. By this preliminary burning process, the upper roof-like portion of the evaporation chamber is heated and this causes an evaporation of the oil. Upon increase of the feeding of oil, the heating flame rises into the combustion chamber 4 disposed between the air-feeding tube 3 and the outer tube 5 towards the openings 9. The flue gases escape through the flue tube 6 passing the turbine fan 20 into the atmosphere.

The lower openings 8 in the air-feeding tube 3 serve also an over-run for the evaporation chamber 2. Within the evaporation chamber 2, the oil can rise no higher than the level of the openings or perforations 8 in the air-feeding tube 3.

In a particular embodiment of the present invention, the individual parts of the furnace have preferably the following measurements:

The air-feeding tube has an inner diameter of 58 mm. and a wall thickness of 1 mm., the outer tube 5 has an inner diameter of 88 mm. and a wall thickness of 1 mm. and a length of about 70 cm. The evaporation chamber 2 has at its bottom a diameter of 12 cm. The lower series of perforations 8 is about 1 cm. above the bottom of the evaporation chamber 2.

The inner diameter of the flue tube 6 amounts to about 68 mm. and the wall thickness is again 1 mm.

The furnace shown in the drawing can be changed in many ways and can be adjusted to any particular application. If it is to be applied, for instance, to the heating of a kiosk sitting on the ground, it is possible to provide a laterally extending suction pipe to be connected with the lower end of the air-feeding tube.

While I have disclosed one embodiment of the present invention, it is to be understood that this embodiment is given by example only and not in a limiting sense, the scope of the present invention being determined by the objects and the claims.

I claim:

1. A tubular oil-heating furnace for vehicles or for small rooms having a roof portion comprising
an evaporation chamber having a substantially cylindrical portion and an upwardly tapered down upper portion,
a first, centrally disposed air feeding tube having a plurality of perforations and extending through said evaporation chamber,
a second tube coaxially surrounding said first tube and having an open upper end for the escape of flue gases, the outer wall of said first tube and the inner wall of said second tube defining an annular combustion chamber,
said first air feeding tube being closed at its upper end and open at its lower end,
said evaporation chamber coaxially surrounding said first air feeding tube and said tapered down upper portion of said evaporation chamber extending closely to said first air feeding tube,
a controllable oil feeding conduit terminating in said evaporation chamber,
said second tube being connected to said tapered-down upper portion of said evaporation chamber,
a third tube connected to the upper end of said second tube and adapted to terminate in the free atmosphere in order to provide an escape for the flue gases from said annular combustion chamber,
the lowermost of said perforations of said first air feeding tube being spaced apart from said bottom portion of said evaporation chamber at a predetermined distance to function as air feeding means and also as oil over flow means from said evaporation chamber, said air feeding tube having a diameter which is a multiple of the radial width of said combustion chamber, and the longitudinal axis of said second tube coinciding with the axis of said third tube.

2. The tubular oil-heating furnace, as set forth in claim 1, which includes
an oil-receptacle disposed below and communicating with the lower opening of said first air feeding tube.

3. The tubular oil-heating furnace, as set forth in claim 1, wherein
said bottom portion of said evaporation chamber has a guide member releasably receiving the lower end of said first air feeding tube,
spacing means between said second tube and said first air feeding means in order to center the latter in said combustion chamber, and
said second tube being releasably received by said tapered-down upper end of said evaporation chamber.

4. The tubular oil-heating furnace, as set forth in claim 1, which includes
a turbo-fan mounted on the upper end of said third tube.

References Cited by the Examiner

UNITED STATES PATENTS

| | | | |
|---|---|---|---|
| 383,171 | 5/88 | Converse | 126—56 |
| 933,051 | 9/09 | Bloom | 98—72 |
| 1,481,564 | 1/24 | Scott | 158—91 |
| 1,623,415 | 4/27 | Kennedy | 158—91 |
| 1,702,929 | 2/29 | Breese. | |
| 1,710,703 | 4/29 | Krebs | 158—91 |
| 1,855,758 | 4/32 | Hill et al. | 158—91 X |
| 2,215,510 | 9/40 | Jones et al. | 126—56 |
| 2,483,925 | 10/49 | Nagel | 158—91 |
| 2,499,308 | 2/50 | Griewank | 126—93 |
| 2,679,867 | 6/54 | Epstein | 126—307 X |
| 2,902,027 | 9/59 | Matthes et al. | 158—91 X |

FOREIGN PATENTS

| | | |
|---|---|---|
| 504,354 | 7/55 | Belgium. |
| 310,765 | 11/55 | Switzerland. |

JAMES W. WESTHAVER, *Primary Examiner.*

FREDERICK L. MATTESON, Jr., PERCY L. PATRICK, *Examiners.*